United States Patent Office 3,796,764
Patented Mar. 12, 1974

3,796,764
HYDROGENATION OF BENZENE TO CYCLOHEXANE
Robert M. Suggitt, Wappingers Falls, and Norman D. Carter, Poughkeepsie, N.Y., assignors to Texaco Inc., New York, N.Y.
No Drawing. Filed June 27, 1972, Ser. No. 266,837
Int. Cl. C07c 5/10
U.S. Cl. 260—667      9 Claims

ABSTRACT OF THE DISCLOSURE

Aromatic hydrocarbons are hydrogenated to corresponding saturated hydrocarbon with high selectivity using an iron group metal catalyst in a first hydrogenation stage and a noble metal catalyst in a second hydrogenation stage.

---

This invention relates to the hydrogenation of aromatic compounds. More particularly, it is concerned with the production of cyclohexane from benzene. In its most specific aspect, it is concerned with the production of cyclohexane in a purity of at least 99.75%.

The hydrogenation of aromatic compounds is well known and has been disclosed thoroughly in the prior art. In the earlier processes an aromatic hydrocarbon such as benzene was contacted with hydrogen in the presence of a hydrogenation catalyst at elevated temperature and pressure with good conversion of benzene to clyclohexane. However, side reactions such as cracking with the production of normal hexane and isomerization with the production of methyl cyclopentane and, in the case of excessively high temperatures, the formation of $C_5$ and lighter hydrocarbons took place. More recently, for the use of cyclohexane as an intermediate for the production of other chemicals it is desirable to obtain cyclohexane in as high a purity as possible. It was subsequently found that to this end it was necessary to control the reaction temperature in known processes to a maximum of about 480–490° F. as otherwise the various undesirable side reactions would take place resulting in a product of lower purity. Since hydrogenation is a highly exothermic reaction, to maintain the reaction temperature below 490° F. various devices were used such as multiple catalyst beds with inter-bed heat exchange and cooling of the reactant stream, tubular reactors in which the catalyst was placed in tubes surrounded by a cooling medium or product cyclohexane injection into the reactant stream at various points for cooling purposes. Eventually the preferred procedure came to be the use of multiple catalyst beds with the introduction of a mixture of the benzene feed and cyclohexane product into the multiple catalyst bed unit and with the introduction of product cyclohexane between the beds for the purpose of cooling the reactant stream to maintain it below 490° F. This unfortunately meant that a large volume of material was being passed through the catalyst bed only a small portion of which was actually being hydrogenated, in effect resulting in a low space velocity. The temperature restriction was also an undesirable control on reaction conditions.

It is therefore an object of the present invention to provide a novel process for the hydrogenation of aromatic compounds. It is a further object of the present invention to convert benzene, toluene and xylenes to the corresponding saturated cyclic hydrocarbons. It is a further object of the present invention to produce saturated cyclic compounds of a purity of at least 99.5%. Still another object is to convert unsaturated aromatic hydrocarbons to the corresponding saturated hydrocarbons at temperatures between about 500 and 675° F. with a minimum production of undesirable byproducts.

These and other objects will be obvious to those skilled in the art from the following disclosure.

According to our invention saturated cyclic hydrocarbon compounds are produced by a process which comprises contacting the corresponding aromatic hydrocarbon compound in the presence of hydrogen under hydrogenating conditions with a first hydrogenating catalyst comprising an iron group metal supported on a refractory inorganic oxide to effect partial hydrogenation and containing the effluent from the first hydrogenation stage with a second hydrogenation catalyst comprising a noble metal supoprted on a refractory inorganic oxide under hydrogenation conditions including a temperature above that of said first zone, said second hydrogenation catalyst containing between 0.01 and 5% by weight alkali metal and recovering substantially pure saturated hydrocarbon compound from the effluent from the second hydrogenation zone.

In a preferred embodiment of our invention benzene feed diluted with cyclohexane product is introduced into a first catalytic hydrogenation zone at a temperature between about 250 and 350° F. in the presence of an excess of hydrogen, where the feed is partially hydrogenated. The reactant stream leaves the first hydrogenation zone at a temperature preferably between about 450 and 475° F. and is introduced into a second catalytic hydrogenation zone where it is contacted with a platinum on alumina catalyst containing a small amount of alkali metal oxide. The reactant stream leaves the second hydrogenation zone at a temperature of about 650° F. After cooling, hydrogen is flashed off leaving substantially pure cyclohexane, a portion of which is recycled for mixture with fresh feed. The hydrogen may be recycled to the first or second hydrogenation zone or partially to both.

One of the features of our invention is that the catalyst in the first hydrogenation zone is considerably less expensive than that in the second zone. Another feature of our invention is that in our dual catalyst process the catalyst in the first reaction zone operates more efficiently at a low temperature. Another feature is that since the first stage catalyst can operate efficiently at a low temperature and the second stage catalyst operates more efficiently at a higher temperature there can be a much greater $\Delta T$ across the over-all reaction zone. For example, if the inlet temperature is 225° F. and the final temperature is 650° F. there is a $\Delta T$ of 425° F. Accordingly, it is not necessary to dilute the benzene charge to the extent necessary when the same catalyst is used in the several beds. Correspondingly the amount of benzene present in the charge can be increased thereby permitting a greater feed rate of benzene than would ordinarily be possible when using a single catalyst. In this way, the amount of benzene which can be hydrogenated per unit volume of reactor space is correspondingly increased.

Another feature of our invention is that, although ordinarily no sulfur is present in the feed to the first hydrogenation zone occasionally there may be an upset whereby if reformer by-product hydrogen is used, a small amount of $H_2S$ may accidentally be introduced into the hydrogenation zone. In this case the sulfur present in the hydrogen will react quantitatively with the nickel in the first stage reactor thereby protecting the expensive second stage catalyst from poisoning by sulfur.

Any aromatic hydrocarbon such as benzene, toluene or xylene may comprise the feed to the first stage hydrogenation zone. In a preferred embodiment the feed to the process of our invention is benzene obtained from the catalytic reforming of a petroleum naphtha and recovered from the reformate by solvent extraction. Ordinarily this benzene is sulfur-free and is to a large extent water-free. However, in a particularly preferred embodiment of the invention the benzene is dehydrated such as by contact with a molecular sieve having pore openings of 5 A. for the removal of any contaminant water and since the recycle cyclohexane is dry, the hydrocarbon feed to the process is substantially anhydrous, that is, contains less than 10 p.p.m. of water.

Since hydrogenation is an exothermic reaction, customarily the feed to the hydrogenation zone is diluted with saturated hydrocarbon for the purpose of absorbing the heat of reaction. Preferably the diluent is the saturated product thereby making product separation much more simple. In the processes of the prior art it was customary to use an over-all dilution of about 4 parts cyclohexane per part of benzene. However, because of the high $\Delta T$ in the process of our invention, less diluent is required and the charge may contain 15–35 weight percent benzene with the balance saturated product.

The hydrogen used in the process of our invention should be substantially pure. For this reason it is advantageous to purify the hydrogen by cryogenic means to remove substantially all impurities. This is particularly true when the hydrogen is obtained as by-product from a catalytic reforming unit. Cryogenic purification will then result in the removal of even small amounts of hydrogen sulfide, ammonia and water. Hydrogen purity is not critical but in commercial plants where the hydrogen is recycled, and inerts such as methane can build up, the hydrogen purity should be at least 95%, and preferably at least 99%.

The catalyst used in the first stage of our process comprises an iron group metal, preferably nickel, supported on a refractory inorganic oxide material such as alumina, silica, magnesia, zirconia and the like, preferably alumina. The nickel may be present in an amount ranging between about 20 and 50% by weight preferably between 30 and 45% by weight. Suitably the catalyst is in the form of pellets. The second stage catalyst comprises a noble metal such as platinum on an alumina support preferably eta alumina or more preferably gamma alumina. The noble metal is present in an amount between 0.01 and 2% preferably between 0.2 and 1% by weight of the catalyst composite. The second stage catalyst also contains a small amount of an alkali metal such as lithium, potassium or sodium or mixtures thereof ranging between about 0.01 and 5% by weight of the catalyst composite of the preferably between 0.1 and 2%. In a preferred embodiment the alkali metal is present as the oxide.

The catalysts are suitable in particulate form such as pills or pellets and in a preferred embodiment are used as a fixed bed with the reactant flow being downward through the bed. Both catalyst beds may be in the same reactor vessel with the first hydrogenation zone being positioned above the second hydrogenation zone or each may be in one or more separate reactor vessels in a flow plan such as that disclosed in U.S. Pat. 3,254,134 to R. Smith et al. In such event catalyst bed No. 3 and the polishing zone of the patent could be considered the second hydrogenation zone of our process.

The pressure in both zones is substantially the same and may range up to about 1000 p.s.i.g. or higher with a preferred range being about 350 to 800 p.s.i.g.

The following examples are submitted for illustrative purposes only. In the tables, LHSV represents liquid hourly space velocity in terms of volumes of total hydrocarbon feed per total catalyst volume per hour. The abbreviation N.D. indicates "none detected." The analyses are made by gas chromatography and reported as area percent.

EXAMPLE I

In this example two charges, A and B, containing approximately 28% and 37% benzene respectively are used. In the reaction zone there are two hydrogenation zones approximately equal in size, the catalyst in the first hydrogenation zone being composed of 35% nickel on alumina. In Table I below where data for this example are set forth, for Sample Nos. 1, 2 and 3, the catalyst in the second stage contains 0.6 weight percent platinum on eta alumina. For Runs 4, 5, 6 and 7, the catalyst in the second hydrogenation zone contains 0.6 weight percent platinum on eta alumina to which 0.5 weight percent $K_2O$ has been added. From the data in Table I, it can be seen that the purity of the cyclohexane is related to the maximum temperature. It is evident that the runs in which the second stage catalyst contains potassium oxide yield purer cyclohexane. At approximately 550° F., the potassium oxide containing catalyst yields 99.88% cyclohexane whereas the catalyst free from potassium oxide yields 99.57% cyclohexane. Likewise at approximately 650° F. 99.8% cyclohexane is produced as compared to 98.8%. For equivalent purity of product, higher conversions of benzene are obtainable with the catalyst containing the alkali metal. For example, the over-all rate of conversion of benzene during the period of Sample No. 7 taking into consideration the space velocity and the benzene content of the charge is approximately twice that of the period of Sample No. 2, the over-all space velocity of the benzene being 2.2, as compared to 1.1. These data show the much greater throughput of benzene using the procedure of our invention.

TABLE I

| Sample number | Feed Ident. | Feed LHSV | Hours on stream This feed | Hours on stream Total | Catalyst bed temp., ° F. Inlet | Catalyst bed temp., ° F. Outlet or maximum | Hexanes | Methyl-cyclo-pentane | Cyclo-hexane | Benzene |
|---|---|---|---|---|---|---|---|---|---|---|
| A | | | | | | | 0.031 | 0.060 | 72.03 | 27.88 |
| B | | | | | | | 0.029 | 0.056 | 63.12 | 36.79 |
| 1 | A | 4 | 12 | 12 | 298 | 548 | 0.09 | 0.13 | 99.57 | 0.21 |
| 2 | A | 4 | 16 | 16 | 330 | 590 | 0.10 | 0.16 | 99.62 | 0.12 |
| 3 | B | 4 | 4 | 22 | 346 | 658 | 0.62 | 0.51 | 98.80 | 0.07 |
| 4 | A | 4 | 4 | 4 | 307 | 551 | 0.045 | 0.072 | 99.88 | N.D. |
| 5 | A | 4 | 10 | 10 | 337 | 611 | 0.049 | 0.074 | 99.87 | N.D. |
| 6 | B | 4 | 4 | 16 | 341 | 658 | 0.090 | 0.104 | 99.80 | N.D. |
| 7 | B | 6 | 10 | 22 | 337 | 690 | 0.111 | 0.114 | 99.65 | 0.12 |

EXAMPLE II

In this example two charges, A and B, containing approximately 28% and 36% benzene respectively are used. The first stage hydrogenation catalyst is the same as that in the first stage of Example I; the second stage catalyst containing 0.75% platinum on gamma alumina and being essentially free from alkali metal oxide. The feed prior to being introduced into the first hydrogenation zone is dried by contact with a molecular sieve having uniform 5 A. pore openings. The data in Table II below show that the maximum reactor temperature has to be limited to not more than 500° F. if by-product hexanes and methyl cyclopentane formation is to be avoided but limiting the maximum temperature to 500° F. reduces the productivity of the unit in that longer residence times and correspondingly lower flow rates are needed to insure that the benzene is converted to cyclohexane. These data also show that in this example, operating under anhydrous conditions does not make a significant difference at temperatures above 500° F.

not be heat exchanged to lower this temperature prior to its entry into the second stage. By introducing benzene

TABLE II

| Sample number | Feed Ident. | Feed LHSV | Hours on stream This feed | Hours on stream Total | Catalyst bed temp., ° F. Inlet | Catalyst bed temp., ° F. Outlet or maximum | Hexanes | Methyl- cyclo- pentane | Cyclo- hexane | Benzene |
|---|---|---|---|---|---|---|---|---|---|---|
| | A | | | | | | 0.023 | 0.049 | 72.04 | 27.89 |
| | B | | | | | | 0.018 | 0.050 | 64.23 | 35.70 |
| 1 | A | 4 | 4 | 4 | 213 | 425 | N.D. | 0.050 | 99.85 | 0.10 |
| 2 | A | 4 | 8 | 8 | 209 | 410 | 0.006 | 0.049 | 99.926 | 0.016 |
| 3 | A | 4 | 12 | 12 | 206 | 414 | N.D. | 0.049 | 99.95 | N.D. |
| 4 | A | 4 | 16 | 16 | 248 | 480 | 0.011 | 0.049 | 99.94 | N.D. |
| 5 | A | 4 | 20 | 20 | 252 | 489 | 0.010 | 0.049 | 99.92 | 0.02 |
| 6 | B | 4 | 4 | 24 | 262 | 573 | 0.217 | 0.168 | 99.61 | N.D. |
| 7 | B | 4 | 8 | 28 | 264 | 618 | 0.215 | 0.199 | 99.59 | N.D. |
| 8 | B | 4 | 12 | 32 | 275 | 615 | 0.200 | 0.218 | 99.58 | N.D. |
| 9 | B | 4 | 16 | 36 | 276 | 624 | 0.190 | 0.234 | 99.58 | N.D. |
| 10 | B | 4 | 20 | 40 | 273 | 620 | 0.156 | 0.217 | 99.62 | N.D. |

EXAMPLE III

This example is a substantial duplicate of Example II except that the second stage catalyst contains 0.41 weight percent lithium oxide. The data in Table III below show that under the anhydrous conditions of this example temperatures of up to at least 650° F. are permissible using the platinum on alumina catalyst containing alkali metal oxide while producing cyclohexane of higher than 99.9% purity. The higher allowable temperatures permit a greater ΔT across the reactor. Since ΔT is related to benzene concentration larger amounts of benzene can be introduced with the feed and the amount of cyclohexane diluent in the feed can be reduced.

between the first and second stages, some quench if desired may be obtained. The temperature of 375–450° F., at which the feed is introduced into the second hydrogenation stage containing the alkali metal-platinum-alumina catalyst is sufficiently high to promote high rates of reaction thus minimizing the amount of platinum catalyst required and overcoming the poisoning effects due to any remaining trace amounts of sulfur. Benzene addition to the stream entering the second hydrogenation zone should be controlled both as to temperature and amount so that the second hydrogenation zone outlet temperature does not exceed about 650° F.

As mentioned above, each hydrogenation stage may

TABLE III

| Sample number | Feed Ident. | Feed LHSV | Hours on stream This feed | Hours on stream Total | Catalyst bed temp., ° F. Inlet | Catalyst bed temp., ° F. Outlet or maximum | Hexanes | Methyl- cyclo- pentane | Cyclo- hexane | Benzene |
|---|---|---|---|---|---|---|---|---|---|---|
| | A | | | | | | 0.027 | 0.051 | 71.89 | 28.03 |
| | B | | | | | | 0.023 | 0.052 | 67.29 | 32.63 |
| 1 | A | 4 | 4 | 4 | 207 | 375 | N.D. | 0.049 | 99.58 | 0.39 |
| 2 | A | 4 | 8 | 8 | 206 | 379 | N.D. | 0.050 | 99.75 | 0.20 |
| 3 | A | 4 | 12 | 12 | 202 | 360 | N.D. | 0.051 | 99.81 | 0.14 |
| 4 | A | 4 | 16 | 16 | 253 | 423 | N.D. | 0.050 | 99.82 | 0.12 |
| 5 | A | 4 | 20 | 20 | 249 | 432 | N.D. | 0.050 | 99.85 | 0.10 |
| 6 | B | 4 | 4 | 24 | 258 | 500 | N.D. | 0.055 | 99.84 | 0.10 |
| 7 | B | 4 | 8 | 28 | 260 | 518 | N.D. | 0.058 | 99.94 | N.D. |
| 8 | B | 5 | 12 | 32 | 259 | 517 | 0.013 | 0.054 | 99.93 | N.D. |
| 9 | B | 5 | 16 | 36 | 259 | 522 | N.D. | 0.052 | 99.97 | N.D. |
| 10 | B | 5 | 20 | 40 | 257 | 506 | 0.014 | 0.053 | 99.93 | N.D. |
| 11 | B | 5 | 22 | 42 | 258 | 568 | 0.011 | 0.053 | 99.935 | N.D. |
| 12 | B | 5 | 26 | 46 | 296 | 668 | 0.021 | 0.063 | 99.915 | N.D. |
| 13 | B | 5 | 30 | 50 | 293 | 636 | 0.019 | 0.061 | 99.92 | N.D. |
| 14 | B | 4 | 34 | 54 | 276 | 611 | 0.015 | 0.057 | 99.93 | N.D. |
| 15 | B | 4 | 38 | 58 | 261 | 612 | 0.018 | 0.058 | 99.92 | N.D. |

By the process of our invention, which in a specific embodiment combines a first stage hydrogenation using a nickel on alumina catalyst with a second stage hydrogenation using a platinum on alumina catalyst containing small amount of alkali metal oxide for the hydrogenation of aromatic hydrocarbons, certain advantages are obtained. The benzene feed to a cyclohexane unit coming from a catalytic reformer is essentially sulfur-free. However, hydrogen obtained as by-product from a catalytic reforming unit is more likely to be contaminated with sulfur if upsets occur in the hydrogen purification system. Accordingly, it is advantageous to bring the hydrogen with recycle cyclohexane and a portion of the benzene feed into contact with a nickel catalyst in the first stage hydrogenation zone. The nickel catalyst partially hydrogenates the feed and removes any sulfur contaminants by forming nickel sulfide. In the meantime an increase in the reactant temperature to about 425–475° F. is effected. Because of the large ΔT permissible in our process the balance of the benzene feed may be injected into the reactant stream for temperature control between the first hydrogenation zone and the second hydrogenation zone. By limiting the amount of benzene introduced into the first stage, the maximum (outlet) temperature is kept below 450–475° F. so that hexane and methyl cyclopentane formation in this stage is minimal. Thus, the effluent stream from the first stage need comprise a single catalyst bed or a plurality of catalyst beds. For example, each stage may contain two catalyst beds or one stage may contain one catalyst bed and the other two or more beds. Where one stage contains a plurality of beds, aromatic hydrocarbon for temperature control can be introduced into the reactant stream between the beds as well as between the stages.

Obviously, various modifications of the invention as hereinbefore set forth may be made without departing from the spirit and scope thereof, and therefore, only such limitations should be made as are indicated in the appended claims.

We claim:

1. A process for the production of at least 99.75% pure cyclohexane which comprises forming a mixture consisting essentially of benzene and cyclohexane contacting said mixture in a first hydrogenation zone with a catalyst consisting essentially of nickel on a refractory inorganic oxide selected from the group consisting of alumina, silica, magnesia and zirconia at a temperature between about 200 and 480° F. with added hydrogen to effect partial hydrogenation of said benzene, contacting the effluent from said first hydrogenation zone in a second hydrogenation zone with a catalyst consisting essentially of platinum on alumina and containing between about 0.01 and 5% by weight of alkali metal at a temperature above that of said first hydrogenation zone and between about 450 and 700° F. to produce a hydrogenation product consisting essentially of cyclohexane having a purity of at least 99.75%.

2. The process of claim 1 in which the aromatic hydrocarbon feed contains less than 100 p.p.m. sulfur.

3. The process of claim 1 in which the first and second hydrogenation zones are maintained under substantially anhydrous conditions.

4. The process of claim 1 in which the benzene feed is contacted with a molecular sieve having pore openings of about 5 A. for the removal of water and normal paraffin contaminants.

5. The process of claim 1 in which the alkali metal is present as lithium oxide.

6. The process of claim 1 in which the alkali metal is present as potassium oxide.

7. The process of claim 1 in which the alkali metal is present as sodium oxide.

8. The process of claim 1 in which the catalyst in said first hydrogenation zone comprises 20–50 wt. percent nickel supported on alumina.

9. The process of claim 1 in which the second hydrogenation zone catalyst also contains between 0.1 and 2.0 wt. percent alkali metal.

References Cited
UNITED STATES PATENTS

| | | | |
|---|---|---|---|
| 3,254,134 | 5/1966 | Smith et al. | 260—667 |
| 3,147,210 | 9/1964 | Hass et al. | 260—667 |
| 3,691,060 | 9/1972 | Inwood | 260—667 |
| 3,427,361 | 2/1969 | Arnold | 260—667 |
| 3,432,565 | 3/1969 | Kouwenhoven | 260—667 |

DELBERT E. GANTZ, Primary Examiner

V. O'KEEFE, Assistant Examiner